Aug. 31, 1937.   E. J. McMANUS   2,091,788
SCREW THREAD
Filed March 20, 1936
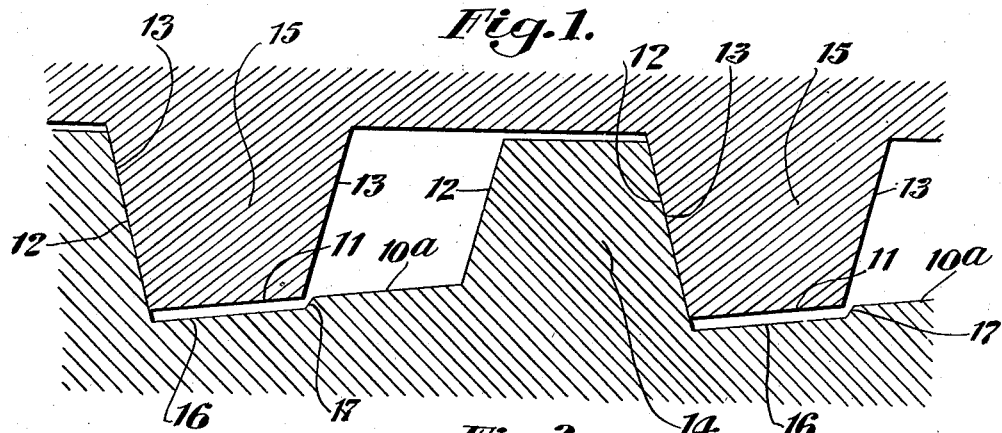
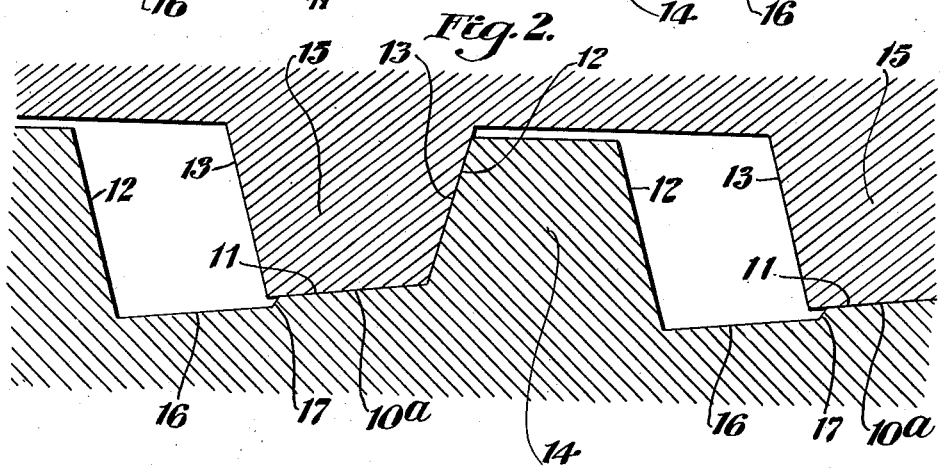
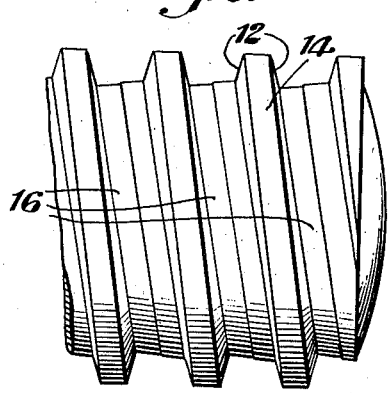
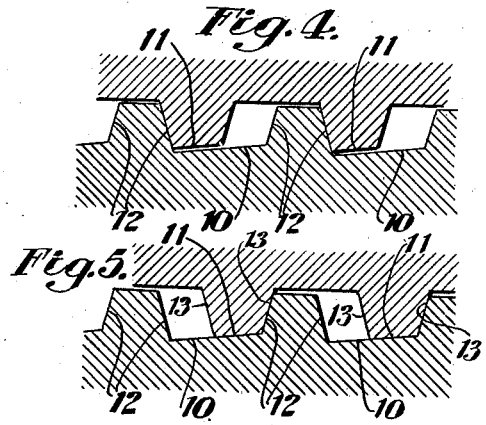
INVENTOR
Edward J. McManus
BY
ATTORNEYS Patented Aug. 31, 1937

2,091,788

UNITED STATES PATENT OFFICE 2,091,788

SCREW THREAD

Edward J. McManus, Orange, N. J., assignor to Dardelet Threadlock Corporation, New York, N. Y., a corporation of Delaware Application March 20, 1936, Serial No. 69,838

3 Claims. (Cl. 151—14)

This invention relates more particularly to improvements in self-locking screw threads of the Dardelet type disclosed in U. S. Patent No. 1,657,244.

An important object of the invention is to provide a Dardelet screw thread with an improved cross-sectional profile so designed as to improve the co-action of the threads in frictional locking engagement, and to afford an increased range of tolerance in the shaping of the thread and also an increased range of tolerance in the shaping of a complementary thread for screw engagement with the improved thread.

Other objects of the invention will appear hereinafter.

In the drawing, Fig. 1 is an enlarged detail sectional view of an external screw thread embodying the improved profile and with an internal screw thread engaged therewith, said threads being in unlocked relation;

Fig. 2 is a view similar to Fig. 1 showing the threads in mutually self-locked relation:

Fig. 3 is a side elevation of an end portion of a bolt embodying the improved thread; and Figs. 4 and 5 are views similar to Figs. 1 and 2 respectively showing Dardelet threads of a standard, commercial form in unlocked and locked relation.

As shown in Figs. 4 and 5, a standard, commercial form of Dardelet external screw thread, such as that of a bolt, has a root locking surface 10 which, in cross section, extends the full width of the bottom of the thread groove. This surface slopes slightly with reference to the thread axis, the rise of its slope being in the direction of the tip of the bolt, that is, away from the bolt head. An internal thread, such as that of a nut, complementary to said external thread, has along its crest a locking surface 11 with a slope similar to that of the root surface 10. The degree of slope is within the angle of friction or the angle of repose of the two locking surfaces. In standard Dardelet threads the slope is six degrees. The groove of each thread is materially wider than its rib to afford clearance for substantial crosswise axial displacement of one thread on the other.

When the nut is screwed home and its axial advance is arrested by contact with an abutment, further rotation of the nut displaces its thread to force its locking surface 11 into frictional locking engagement with the sloping locking surface 10 of the bolt thread, as shown in Fig. 5. The sloping surface 10 is directly opposed to the surface 11 from start to finish of the movement of surface 11 from unlocked to locked position. Consequently when surface 11 is displaced to the right for locking, its entire area makes a broadside engagement with the surface 10 and imposes a sudden resistance which is liable to fool the workman into thinking that the connection is tightened. Much force is required to fully tighten the connection because of the drag of said full, broadside engagement from the time surface 11 engages surface 10 until the locking limit is reached and abutment 13 engages abutment 12, as shown in Fig. 5. In the screwing of the nut up to the abutment, and in the unscrewing of the nut, the thread of the nut is displaced in the opposite direction to dispose its locking surface 11 out of contact with the locking surface 10 for free rotation of the nut. The rib of the bolt thread has side faces 12 abrupt with reference to the thread axis, and the rib of the nut thread has similarly abrupt side faces 13 to abut the faces 12 and positively limit thread displacement in both directions. In the standard, commercial Dardelet thread the surfaces 12 and 13 are each disposed at an angle of fourteen and one-half degrees to a line normal to the thread axis.

Threads of the type just described require very accurate shaping for proper functioning. For free screwing and unscrewing it is necessary that there be clearance between the locking surfaces 10 and 11 when the threads are in the relative positions shown in Fig. 4. At the same time the allowable clearance is limited by the necessity for adequate locking effect when the threads are in the relative positions shown in Fig. 5. Consequently the range of tolerance, or maximum allowable variation in size, in the forming of the surfaces 10 and 11 is quite limited. In fact the said tolerance is limited to a few thousandths of an inch for quite a wide range of thread sizes. An important purpose of the present invention is to materially increase the range of said tolerance in a simple manner, with a minimum deviation from a standard commercial Dardelet thread profile, without sacrifice of thread-locking effect and in fact with increased locking effect in some cases.

The improved co-action of the threads in frictional locking engagement, and the advantages of increased tolerance are obtained by an improvement in the profile of the external thread, or the thread which has the sloping locking surface at its root. An external thread 14 embodying this improvement is shown in Figs. 1, 2 and 3. There, in order to ensure the gradual and progressive overlapping engagement between the sloping crest and root locking surfaces, and adequate clearance for the crest 11 of the complementary internal thread 15 the groove bottom is formed with a helicoidal relief depression 16 which extends along the base of one face 12 of the thread rib and extends widthwise to a medial point in the width of the groove. The sloping locking surface 10ª of the external thread is thereby rendered shorter. It extends only from said medial point to the opposite face of the thread rib. The width of the relief depression exceeds the width of the rib crest 11 of the complementary thread by several thousandths of an inch, and the depression is deeper in the groove than the lowest point of the locking surface 10ª. A side wall 17 of the depression connects the bottom of the depression with the adjacent low edge of the sloping surface 10ª. Said wall 17 may be normal to the thread axis or it may slope, as shown. It should be much more abrupt to the thread axis than the surface 10ª in order to avoid contact with the adjacent corner of the thread crest 11 when the threads are in their unlocked relation, as shown in Fig. 1. The depth of the relief depression may be only several thousandths of an inch below the surface 10ª in order to afford adequate relief, without appreciable sacrifice of tensile strength in the bolt.

In Fig. 1 the crest 11 of the internal thread is shown in a position overlying the relief depression and coincident or substantially coincident with the prolongation of the line of slope of the surface 10ª, and entirely out of contact with the external thread. The position of the crest 11 may vary to thousandths of an inch without impairing the locking cooperation of the threads and also without hindering free screwing and unscrewing when the threads are in their unlocked relation. It is also possible to vary the position of the surface 10ª to thousandths of an inch relatively to the crest surface 11, without objectionable effect upon the screwing and unscrewing of the threads. Due to the provision of the relief depression either of the locking surfaces 10 and 11 may be safely raised or lowered relatively to the other without objectionable effect. It has been found by trial that if the crest 11 is so positioned as to strike the side wall 17 of the depression in the locking shift of one thread on the other there occurs no objectionable resistance to the riding of the crest 11 onto the surface 10ª. The invention provides a materially greater range of tolerance in the shaping of the threads than is afforded by the threads profiled as in Figs. 4 and 5.

The depression or channel 16 and the associated sloping locking surface 10ª are so formed and arranged with reference to each other and to the crest rib locking surface 11 as to afford a radial tolerance which permits relative radial variation of the positions of both of said locking surfaces when unlocked, from one relation in which the crest surface 11 is disposed intermediate the depth of the channel 16 to another relation in which the crest surface 11 is spaced radially outside of the channel and in axial alinement with a point intermediate the rise of the sloping root locking surface 10ª and still secure throughout said range of radial variation gradual progressive locking coaction of said surfaces and a gradual and progressive separation of said sloping parts in the unlocking operation, and at the same time also provide clearance for free screwing when the threads are in unlocked relation. The channel 16 is a tolerance-augmenting element, and the sloping locking surface 10ª when associated with the channel becomes another tolerance-augmenting element.

Referring to Fig. 1 it will be seen that when the threads are unlocked the surface 11 is entirely displaced from the surface 10ª. When the displacement of surface 11 to the right for locking action occurs only a small marginal area of the surface 11 will at first engage the surface 10ª. The remainder of surface 11 will still overhang the helicoidal depression 16 and impose no drag resistance. Consequently there is no strong, abruptly imposed resistance to the movement of surface 11. As the displacement of the surface 11 to the right continues, more and more of the area of said surface is brought into engagement with surface 10ª. The screwing resistance, due to the increase in compression by wedging effect of the slope of the surfaces 11 and 10ª and due to the drag of increased area of surface 11 brought into engagement with surface 10ª, is gradual and progressive until movement of surface 11 to the right is abruptly stopped by engagement of abutment 13 with abutment 12. There is therefore a gradually and progressively increasing overlapping engagement between the sloping crest and root locking surfaces in screwing the threads together and a gradually and progressively increasing radially exerted elastic grip between said sloping crest and root surfaces as the area of said crest and root surfaces in engagement increases.

Important practical advantages derive from the said provision for increased tolerance. It ensures interchangeability of Dardelet threads of the same pitch and diameter. It enables complementary threads to be shaped for more positive mutual locking effect without sacrifice of free screwing and unscrewing when the threads are in unlocked relation. It facilitates and cheapens the manufacture of both external and internal threads. In the case of the cutting of the bolt thread it eliminates much adjustment of the chasers or dies employed. In the cutting of the nut thread a materially greater wear-down of the tap is permissible, with consequent increased production obtainable from the tap. It renders more practicable the forming of Dardelet threaded bolts by hot rolling. It allows for electroplating with cadmium nickel and chromium, for example, or for galvanizing the threads without obstructing their working cooperation. It enables threads to be heat treated without danger of distortion beyond a satisfactory working fit. It, in general, extends the range of materials and the range of processes which may be employed in the manufacture of the threads without danger of faulty fitting of complementary external and internal threads.

Another important advantage which results from the provision for increased tolerance is that the degree of locking effect can be varied by varying the minimum diameter of the nut thread. For example, if the nut thread be gauged to the present standard for Dardelet nut threads the sloping surface of the crest of the nut thread will first contact a considerable distance up on the sloping surface of the bolt thread groove toward the thread rib abutment at the high side of the sloping surface. This will give one degree of locking effect. By gauging the nut thread to bring the thread rib crest locking surface substantially coincident with the angle of the sloping surface of the bolt thread groove a very pronounced increase in locking effect will be obtained. By gauging the nut thread so that the crest of the thread rib will extend slightly into the depression in the bolt thread groove so that there will be a slight interference at the shoulder 15 when the parts are brought into locking engagement there will be a still greater locking effect.

It will be seen that very important practical advantages are obtained by a very simple improvement in the design of only one of the two complementary threads. This improvement, most desirably, entails only a minimum deviation from the design of standard, commercial Dardelet threads. Only the root design of the external thread is changed. The design of the internal thread may remain unchanged from the standard, as may also the general shape and proportions of both threads.

What I claim is:

1. A self-locking screw coupling including two members with complementary external and internal threads formed to afford clearance between their ribs for substantial crosswise relative axial shift when interfitted and with steep rib side faces to limit said shift, all as in the known Dardelet type of screw coupling, a helicoidal tolerance-augmenting channel formed in the bottom of the thread groove of one of said threads and extending along one side face of its thread rib, said thread groove having a thread-locking bottom surface extending in a straight line widthwise from one margin of said channel toward the opposite side face of the thread rib across the thread groove and with a continuous crosswise slope with reference to the thread axis within the angle of repose, and a single helicoidal sloping locking surface on the other thread and comprising the entire rib crest surface thereof and of less width than said channel and disposable in radial register with the channel and out of contact with the bottom thereof at one limit of said axial shift, said sloping rib crest surface being preformed to extend in a straight line crosswise of the rib and incline at the same angle with reference to the thread axis as said sloping thread-locking groove bottom surface of the other thread and in the same direction to present it for gradual, progressive, compressive wedging on said sloping surface and gradual increase of area of contact of said surfaces by relative shift of said crest surface axially out of radial register with said channel to the opposite limit of said axial shift, the depths of the two threads being so proportioned with relation to each other that said compression will be within the elastic limit of the metal in contact and be substantially uniform throughout the area in contact.

2. A self-locking screw coupling according to claim 1, characterized in that the said tolerance-augmenting channel and associated sloping thread-locking groove bottom surface are borne by the external one of the complementary threads, the said locking rib crest surface for coaction with said groove bottom surface is borne by the internal thread, and the tolerance-augmenting channel forms an abrupt depression along the low side of the sloping groove bottom locking surface.

3. A self-locking screw coupling according to claim 1, characterized in that the side wall of the said tolerance-augmenting channel which is adjacent to the said sloping groove bottom surface meets the adjacent edge of said surface at a steep angle and the rib face of the other thread which is nearest to said groove side wall in the unlocked relation of the threads also meets the adjacent edge of the said crest locking surface at a steep angle.

EDWARD J. McMANUS.